US012465941B2

(12) United States Patent
Zi et al.

(10) Patent No.: US 12,465,941 B2
(45) Date of Patent: Nov. 11, 2025

(54) RIGID-FLEXIBLE COUPLED MULTI-HOLE SPRAY GUN DEVICE WITH VARIABLE SIZE FOR SPRAYING ROBOT

(71) Applicant: HEFEI UNIVERSITY OF TECHNOLOGY, Anhui (CN)

(72) Inventors: Bin Zi, Anhui (CN); Jingyuan Wang, Anhui (CN); Feng Xu, Anhui (CN); Yuan Li, Anhui (CN); Bin Zhou, Anhui (CN); Sen Qian, Anhui (CN); Jiahao Zhao, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 0 days.

(21) Appl. No.: 18/700,714

(22) PCT Filed: Apr. 28, 2023

(86) PCT No.: PCT/CN2023/091490
§ 371 (c)(1),
(2) Date: Apr. 12, 2024

(87) PCT Pub. No.: WO2024/174378
PCT Pub. Date: Aug. 29, 2024

(65) Prior Publication Data

US 2025/0235889 A1 Jul. 24, 2025

(30) Foreign Application Priority Data

Feb. 24, 2023 (CN) ......................... 202310161361.3

(51) Int. Cl.
*B05B 15/68* (2018.01)
*B05B 1/14* (2006.01)

(52) U.S. Cl.
CPC ................ *B05B 15/68* (2018.02); *B05B 1/14* (2013.01)

(58) Field of Classification Search
CPC B05B 15/18; B05B 1/14; B05B 13/04; B05B 13/0431; B05B 12/00; B05B 12/14
See application file for complete search history.

(56) References Cited

FOREIGN PATENT DOCUMENTS

| | | |
|---|---|---|
| CN | 109249407 | 1/2019 |
| CN | 111889248 | 11/2020 |

(Continued)

OTHER PUBLICATIONS

"International Search Report (Form PCT/ISA/210) of PCT/CN2023/091490," mailed on Nov. 17, 2023, with English translation thereof, pp. 1-4.

(Continued)

*Primary Examiner* — Steven M Cernoch
(74) *Attorney, Agent, or Firm* — JCIPRNET

(57) ABSTRACT

A rigid-flexible coupled multi-hole spray gun device with variable size for a spraying robot is disclosed in the present disclosure, which is relates to the field of the spraying robot. The spray device includes a rigid-flexible coupled deformable bracket, a spray head assembly and a spray gun base. The rigid-flexible coupled deformable bracket is configured to connect the spray head assembly and the spray gun base. The spray gun is controlled by the motor to implement the deformation with the axial telescopic and the axial bending, as well as the deformation in increasing or decreasing the cross-sectional area. The partitioned spray holes of the spray head assembly is matchable with the change of the diameter of the elastic paint supply pipe to adjust the spraying width of the spray gun. A driving unit and a paint supply assembly are arranged in the spay gun base.

13 Claims, 10 Drawing Sheets

(56) References Cited

FOREIGN PATENT DOCUMENTS

| | | | | | |
|---|---|---|---|---|---|
| CN | 213414362 | | | 6/2021 | |
| CN | 113117942 | | | 7/2021 | |
| CN | 113843822 | | | 12/2021 | |
| CN | 113117942 | B | * | 3/2022 | ............. B05B 12/00 |
| CN | 114750203 | | | 7/2022 | |
| CN | 114851180 | A | * | 8/2022 | ......... B05B 13/0431 |
| CN | 217856885 | | | 11/2022 | |
| JP | 2019155491 | | | 9/2019 | |

OTHER PUBLICATIONS

"Written Opinion of the International Searching Authority (Form PCT/ISA/237) of PCT/CN2023/091490," mailed on Nov. 17, 2023, with English translation thereof, pp. 1-7.

* cited by examiner (a)

(b)

RIGID-FLEXIBLE COUPLED MULTI-HOLE SPRAY GUN DEVICE WITH VARIABLE SIZE FOR SPRAYING ROBOT

CROSS-REFERENCE TO RELATED APPLICATION

This application is a 371 of international application of PCT application serial no. PCT/CN2023/091490, filed on Apr. 28, 2023, which claims the priority benefit of China application no. 202310161361.3, filed on Feb. 24, 2023. The entirety of each of the above-mentioned patent applications is hereby incorporated by reference herein and made a part of this specification.

TECHNICAL FIELD

The present disclosure relates to the field of spraying robots, and specially relates to a rigid-flexible coupled multi-hole spray gun device with variable size for a spraying robot.

DESCRIPTION OF RELATED ART

As an important branch of the intelligent robots in the field of the industrial manufacturing, spraying robots are widely used in the fields such as the automobiles, ships, and the aerospace, and have played a great role in improving the operating environment and increasing the production efficiency. At present, in China, the intelligent single-color spraying technology for the vehicle and aircraft industries is relatively mature, but the development foundation and ability in multi-color spraying of complex components with personalized patterns are still relatively weak. For the traditional spraying robots, most of the end effectors of the traditional spraying robots are the rigid air spray guns, and the spraying targets for the traditional spraying robots can merely be the monochrome spraying on the outer surface of the relatively flat and wide workpieces, and it is difficult for the traditional spraying robots to implement the even and the stable spraying on the narrows corners and the internal surfaces of some workpieces, and it is also impossible for the traditional spraying robots to spray multi-color complex patterns efficiently.

Most of the spray guns in China and abroad are the rigid structures, which are installed on the automatic actuator to carry out the spraying operations. However, the spray gun itself does not have the functions of the deformation and the posture adjustment. For example, an automatic spray gun for a spraying workshop is provided in the Chinese invention patent with the application number of CN217856885U. A lifting mechanism is combined with a spray gun in this invention, which enables the spray gun to move up and down in a certain range, so that the movement range of the spray gun is improved to a certain extent, but due to the lack in the flexibility of the spray gun itself, it is impossible for the spray gun itself to implement the bending and the telescoping. and it is also impossible for the spray gun to change the diameter as required, and it is difficult to solve the problem of spraying on the complex environments such as the narrow corners and the inner cavities of the workpieces.

SUMMARY

A rigid-flexible coupled multi-hole spray gun device with variable size for a spraying robot is provided in the present disclosure, which solves the problems that the formation with telescoping, bending, and variable diameter of the spray gun utilized for the spraying robot in the prior art is not implemented.

In order to achieve the above objectives, the technical solutions adopted in the present disclosure are as follows.

Provided is a rigid-flexible coupled multi-hole spray gun device with variable size for a spraying robot. The spray gun device comprises a rigid-flexible coupled deformable bracket (1), a spray head assembly (2), a spray gun base (3), and further includes a paint supply assembly.

The rigid-flexible coupled deformable bracket (1) includes rigid-flexible coupled elastic split-bodies (101) with a number of N, N≥2, the N rigid-flexible coupled elastic split-bodies (101) are distributed along a circumferential direction, and a twin threaded rod (102) is arranged between two adjacent rigid-flexible coupled elastic split-bodies (101) along a circumferential direction, threads of the twin threaded rod (102) are divided into two threaded segments with opposite rotating directions, the two threaded segments of the twin threaded rod (102) are rotatably installed in the two corresponding rigid-flexible coupled elastic split-bodies (101) respectively, and one end of each of the rigid-flexible coupled elastic split-bodies (101) in a same direction is respectively connected to the spray gun base (3) through a movement supporting component, each of the rigid-flexible coupled elastic split-bodies (101) is deformable in bending and elastic telescoping, and is restored to an original shape of the rigid-flexible coupled elastic split-body under an elastic action, so that the rigid-flexible coupled deformable bracket is deformable in bending and telescoping and is restored to an original shape of the rigid-flexible coupled deformable bracket as a whole, when the twin threaded rod (102) is rotated, the two corresponding rigid-flexible coupled elastic split-bodies (101) are moved away from an central axis of the rigid-flexible coupled deformable bracket or approximate to the central axis of the rigid-flexible coupled deformable bracket, so that the rigid-flexible coupled deformable bracket is capable of deforming with variable cross-sectional area in increasing or decreasing the cross-sectional area perpendicular to the center axis of the rigid-flexible coupled deformable bracket.

The spray head assembly (2) includes a plurality of nozzles (202) and nozzle installation components configured to install the nozzles (202), in the rigid-flexible coupled deformable bracket (1), another end of each of the rigid-flexible coupled elastic split-bodies (101) in a same direction is connected to the nozzle installation component through a movement supporting component.

The paint supply assembly is configured to deliver spray paint to the nozzles (202) in the spray head assembly (2).

Further, the rigid-flexible coupled deformable bracket (1) is divided into a M-layered rigid ring body (1011), M≥2, each layer of the rigid ring body (1011) is equally divided into rigid sub-bodies (1014) with a number of N in the circumferential direction, and a corresponding layer of the rigid ring body (1011) is formed by combining the N rigid sub-bodies (1014) in the circumferential direction, the twin threaded rod (102) is arranged between the two circumferentially adjacent rigid sub-bodies (1014) in each layer of the rigid ring body (1011), the two threaded segments of the twin threaded rod (102) are rotatably installed in the two corresponding rigid sub-bodies (1014), respectively.

Circumferential positions of the rigid sub-bodies (1014) in the M-layered rigid ring body (1011) are in one-to-one correspondence, M layers of the rigid sub-bodies (1014) corresponding to each circumferential position are taken as a sub-body group, so that N sub-body groups are formed by the rigid sub-bodies (1014) in each layer of the M rigid ring body (1011), and each of the sub-body groups includes the M layers of the rigid sub-bodies (1014).

At least one rigid telescopic component (1012) and at least two elastic components (1013) are arranged between two adjacent layers of the rigid sub-bodies (1014) in each of the sub-body groups, both ends of the rigid telescopic component (1012) are respectively ball-hinged to two corresponding layers of the rigid sub-bodies (1014), both ends of the elastic components (1013) are respectively fixedly connected to the two corresponding layers of the rigid sub-bodies (1014), the rigid-flexible coupled elastic split-body (101) is formed by the M layers of the rigid sub-bodies (1014), the rigid telescopic component (1012) and the elastic components (1013) in each of the sub-body groups, so that the rigid-flexible coupled elastic split-bodies (101) with the number of N are obtained, and a first layer and a second layer of the rigid sub-bodies (1014) are served as ends of the corresponding rigid-flexible coupled elastic split-body (101).

Further, the spray gun device further includes a flexible drive unit, the flexible drive unit is arranged on the spray gun base (3), the flexible drive unit is connected to each of the rigid-flexible coupled elastic split-bodies (101) through a flexible connector to connect to one end of the nozzle installation component, the flexible drive unit pulls and acts on the rigid-flexible coupled elastic split-body (101) through the flexible connector to drive the rigid-flexible coupled elastic split-body (101) for deforming in elastic contracting, when all the rigid-flexible coupled elastic split-bodies (101) are driven by the flexible drive unit to deform in elastic contracting, the rigid-flexible coupled deformable bracket is deformed in contracting as a whole, and when one part of the rigid-flexible coupled elastic split-bodies (101) are driven by the flexible drive unit to deform in the elastic contracting, remaining rigid coupled elastic split-bodies (101) are passively deformed in elastic bending, so that the rigid-flexible coupled deformable bracket is deformed in bending as a whole.

Further, the flexible drive unit includes dual-output motors (301) with a number of N, the N dual-output motors (301) are distributed along a circumferential direction and positions of the N dual-output motors are in one-to-one correspondence with positions between the two circumferentially adjacent rigid-flexible coupled elastic split-bodies (101), and two output shafts of each of the dual-output motors (301) are respectively wound with ropes (303) served as the flexible connectors.

One of ropes (303) wound on each of the dual-output motors (301) is penetrated a corresponding one of the rigid-flexible coupled elastic split-bodies (101), another one of the ropes wound on each of the dual-output motors (301) is penetrated another corresponding one of the rigid-flexible coupled elastic split-bodies (101), and one end of each of the ropes (303) is respectively fixed to one end of the corresponding penetrated rigid-flexible coupled elastic split-body (101) configured to connect with the nozzle installation component.

Further, the spray gun device further includes a rotating drive unit, the rotating drive unit is arranged on the spray gun base (3), the rotating drive unit is connected to each of the twin threaded rod (102) through transmission components, and the twin threaded rod (102) is driven by the rotating drive unit through the transmission components to rotate.

Further, the rotating drive unit includes single-output motors (304) with a number of N. the N single-output motors (304) are distributed along a circumferential direction and the positions of the N single-output motors (304) are in one-to-one correspondence with the positions between the two circumferentially adjacent rigid-flexible coupled elastic split-bodies (101), an output shaft of each of the single-output motors (304) is respectively wound with a transmission belt (306) served as the transmission component, and a number of the transmission belts wound on each of the single-output motors (304) is same as a number of the twin threaded bolt (102) between the two circumferentially adjacent rigid-flexible coupled sub-bodies (101) corresponding to the single-output motor (304).

The transmission belt (306) of each of the single-output motors (304) is correspondingly wound on the twin threaded rod (102) between the two rigid-flexible coupled elastic split-bodies (101) one by one, so that each of the single-output motors (304) is in transmission-connection with each of the twin threaded rod (102) between the two rigid-flexible coupled elastic split-bodies (101) corresponding to the single-output motor (304) through the transmission belt (306), and each of the twin threaded rods (102) is driven by the corresponding single-output motor (304) to rotate through the transmission belt (306).

Further, the paint supply assembly includes elastic paint supply pipes (5), the elastic paint supply pipes (5) are penetrated an area surrounded by the rigid-flexible coupled deformable bracket (1), and orifices of the elastic paint supply pipes (5) are in communication with the nozzles (202) in the nozzle assembly (2), and paint liquids are delivered to the nozzles (202) by the paint supply assembly through the elastic paint supply pipes (5).

In the rigid-flexible coupled deformable bracket (1), an inner side of each of the rigid-flexible coupled elastic split-bodies (101) is respectively connected to an circumferential outer side of the elastic paint supply pipe (5) through a connector (1015), so that when the rigid-flexible coupled elastic split-body (101) is moved away from the central axis of the rigid-flexible coupled deformable bracket (1) or moved approximate to the central axis of the rigid-flexible coupled deformable bracket (1), and the elastic paint supply pipe (5) is deformed in increasing a pipe diameter or decreasing the pipe diameter.

Further, a plate surface of the nozzle installation component is divided into N painting areas in a circumferential direction, each of the painting areas is provided with a plurality of nozzles (202), and a position of another plate surface of the spray head plate (201) corresponding to the painting area is provided with grooves (204), a plurality of paint inlets (203) are arranged inside each of the grooves (204), and each nozzle (202) in each of the painting area is communicated with the paint inlet (203) in the corresponding groove (204) one by one.

N elastic paint supply pipes (5) are provided, the orifices of the N elastic paint supply pipe are in contact with the grooves (204) on another plate surface of the nozzle plate (201) one by one, and an area of the orifice of the elastic paint supply pipe (5) is covered and in communication with parts of the paint inlets (203) in the corresponding groove (204), an inner surface of each of the N rigid-flexible coupled elastic split-bodies (101) is connected to a circumferential side surface of each of the N elastic paint supply pipes (5) through the connector (1015) one by one, and side walls of the adjacent elastic paint supply pipes (5) are connected to each other, so that the N elastic paint supply pipes (5) are connected in parallel with each other.

In the present disclosure, the main body of the spray gun device is a rigid-flexible coupled deformable bracket. The rigid-flexible coupled deformable bracket is assembled by a plurality of rigid-flexible coupled elastic split-bodies along the circumferential direction. Each of the rigid-flexible coupled elastic split-bodies is elastically telescopic and deformable in bending. The rigid-flexible coupled deformable bracket is deformed in telescoping and bending through applying the pulling force on the rigid-flexible coupled sub-body by the flexible drive unit. The twin threaded rod is rotatably installed between the circumferentially adjacent rigid-flexible coupled sub-bodies, and the twin threaded rod is driven by the rotating drive unit to rotate, so that each of the rigid-flexible coupled elastic split-bodies in the circumferential direction is moved with contraction and the expansion, thereby implementing the deformation in reducing or expanding the cross-sectional area of the entire rigid-flexible coupled deformable bracket.

In the rigid-flexible coupled deformable bracket, the rigid ring body is composed of a number of N rigid sub-bodies in the same circumferential direction. The rigid-flexible coupled elastic split-body is composed of the rigid sub-bodies in circumferentially positional correspondence with each other, rigid telescopic components and the elastic components. The whole structure of the rigid-flexible coupled deformable bracket is a frame structure, having the excellent rigid-flexible coupled structural characteristics.

In the present disclosure, the spray head assembly and the spray gun base are connected by the rigid-flexible coupled deformable bracket. Based on the above structure of the rigid-flexible coupled deformable bracket, the entire spray gun can be adjusted in length, bent and changed in diameter as required.

In the present disclosure, the elastic paint supply pipe is connected with each of the rigid-flexible coupled elastic split-bodies through the connector, so that when the rigid-flexible coupled elastic split-body is extended and bent, the elastic paint supply pipe is extended and bent accordingly. When the cross-sectional area of the entire rigid-flexible coupled deformable bracket is reduced and expanded causing by the contraction and expanding motions of each of the rigid-flexible coupled elastic split-bodies, the elastic supply paint pipe is deformed in decreasing diameter manner or increasing diameter manner. So that the diameter of the elastic supply pipe is adjustable as required, thereby implementing the adjustment of the paint liquid flow and eventually realizing the function of adjusting the spray width of the spray gun by adjusting the paint liquid flow.

In the spray gun provided in the present disclosure, the spray head assembly is a multi-hole spray head structure. The nozzles are arranged in partitions on the nozzle installation component, and a plurality of the elastic paint supply pipes are adopted to deliver the paint liquids to the nozzles in the corresponding partitions accordingly. Each of the elastic paint supply pipe is pulled along with the movement of the rigid sub-body, and each of the elastic paint supply pipes is pulled by the remaining adjacent elastic paint supply pipes, so that each of the elastic paint supply pipes is deformable in decreasing the diameter or increasing the diameter, thereby implementing the precise spraying operation with adjustable spray width.

The flexible driving modes such as the ropes and the transmission belts are adopted in the present disclosure to drive the rigid-flexible coupled deformable bracket to deform. Therefore, when the rigid-flexible coupled deformable support is adopted as the spray gun of a spraying robot. the deformation of the entire spray gun are controlled and adjusted on the basis of satisfying the requirements for the structural characteristics of the rigid-flexible coupling.

In the present disclosure, the shape of the bracket can be controlled to deform, which has the high flexibility of the rigid-flexible coupling, and solves the problem of spraying on surfaces that are difficult to be sprayed by ordinary spray guns such as inner cavities and narrow corners of workpieces.

Compared with the prior art, the beneficial effects of the present disclosure are as follows.

1. A continuous spray gun structure with a plurality of groups of the rigid telescopic components and the elastic components connected in series is adopted in the present disclosure, so that the spray gun is moved with bending and twisting, and can move to different positions for spraying, which improves the flexibility of the spray gun when spraying complex components, enhances the adaptability to the unstructured spraying operating environment.

2. The rigid-flexible coupled deformable bracket is driven by the ropes to change the thickness, the length and the bending deformation of the spray gun in the present disclosure, which ensures that the spray gun can pass through the narrow holes of the complex workpieces and can spray the interior of workpieces, and can adapt to the application scenarios of spraying inside the complex cavity.

3. A multi-nozzle structure is adopted in the present disclosure, which enables the spray gun to change the spraying width at any time according to the task requirements during spraying on the multi-color complex patterns, and can complete the multi-color spraying for the individualization patterns on the surface and the internal cavity of the complex workpieces, and can greatly improve the precision and the operation efficiency of the multi-color pattern spraying.

DESCRIPTION OF THE EMBODIMENTS

In order to enable those skilled in the art to better understand the solution of the present disclosure, the embodiments of the present disclosure will be described in detail below with reference to the accompanying drawings and embodiments, so as to fully understand and implement the implementation processes that how to solve the technical problems by the technical solutions and how to achieve the corresponding technical effects in the present disclosure. The embodiments of the present disclosure and the various features in the embodiments can be combined with each other without conflict, and the technical solutions formed by these features are all within the scope of protection of the present disclosure.

It will be apparent that the described embodiments are merely one part of embodiments of the present disclosure rather than all the embodiments. Based on the embodiments of the present disclosure, all other embodiments obtained by the person of ordinary skill in the art without making creative efforts should fall within the protection scope of the present disclosure.

It should be noted that the terms "comprising" and "having" in the description, claims and the above drawings in the present disclosure, as well as any variations thereof, are intended to cover a non-exclusive inclusion, for example, including processes, methods, systems, products or devices of a series of steps or units, which is not necessarily limited to those steps or elements explicitly listed, but may include other steps or elements not explicitly listed or inherent to the process, method, product or device.

Embodiment One

Figure 1:
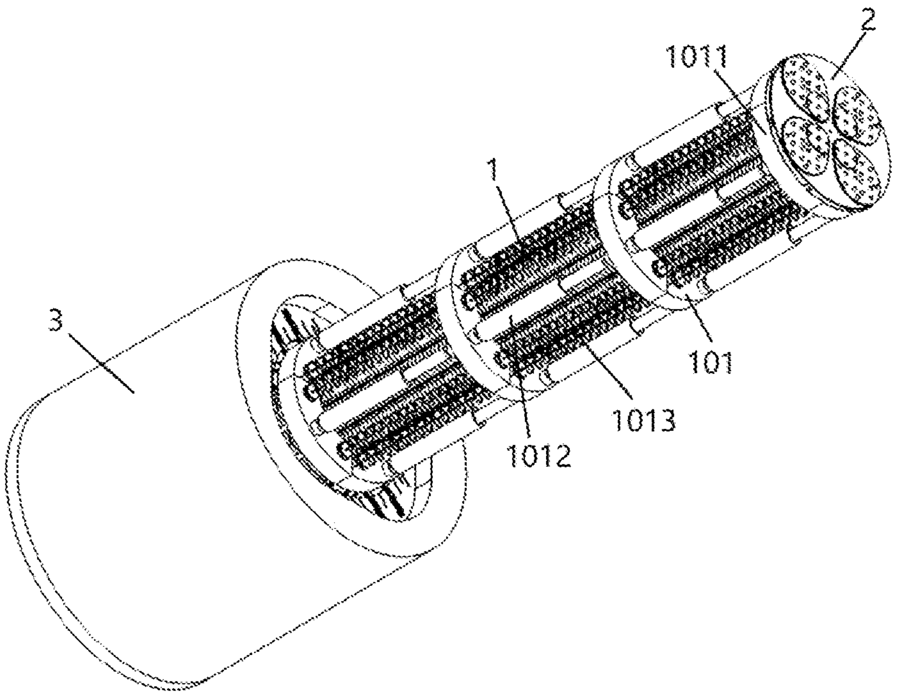
FIG. 1 illustrates a schematic diagram of an initial structure of a spray gun in the present disclosure.
Figure 2:
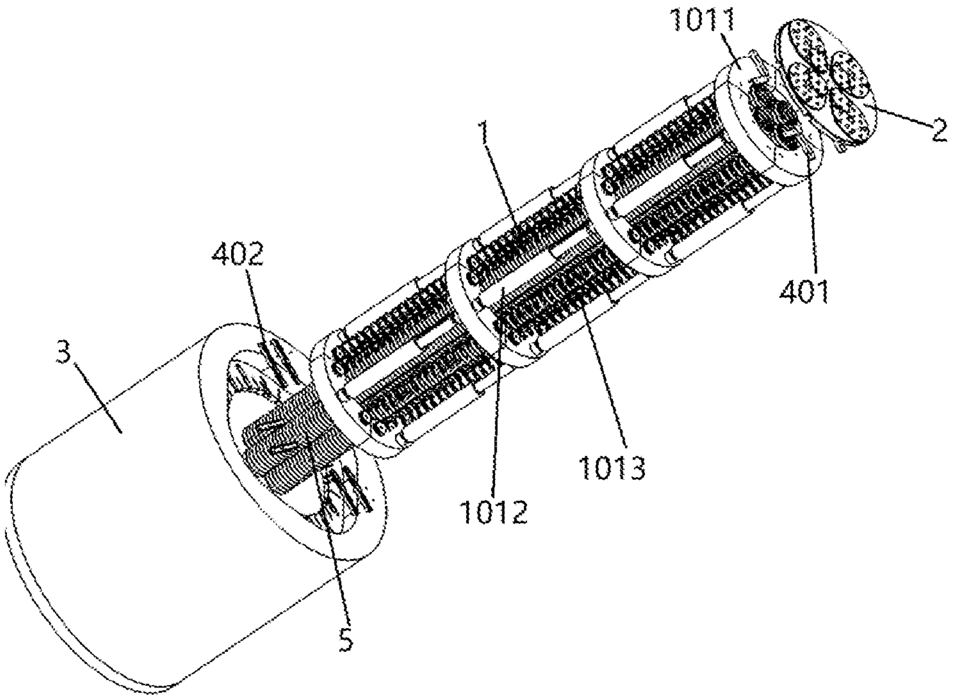
FIG. 2 illustrates an exploded schematic diagram of structures of a spray gun base, a rigid-flexible coupled deformable bracket and a spray head assembly in the present disclosure.

As illustrated in FIGS. 1 and 2, a rigid-flexible coupled multi-hole spray gun device with variable size is disclosed in this embodiment. The spray gun device includes a rigid-flexible coupled deformable bracket 1, a spray head assembly 2, a spray gun base 3, and a paint supply assembly. The rigid-flexible coupled deformable bracket 1 is configured to connect the spray head assembly 2 and the spray gun base 3. When the entire spray gun is in an initial undeformed state, the rigid-flexible coupled deformable bracket 1, the spray head assembly 2 and the spray gun base 3 are in coaxial.

In this embodiment, the rigid-flexible coupled deformable bracket 1 is a ring column structure in an undeformed state. The rigid-flexible coupled deformable bracket 1 of a circular-ring column structure is taken as an example for illustration in this embodiment, but it should be noted that the ring column structure in the embodiment does not exclude other regular columnar structures such as the square ring column, the hexagonal ring column, and other regular columnar structures should also be deemed to fall within the protection scope of the claims of the present disclosure.

Figure 3:
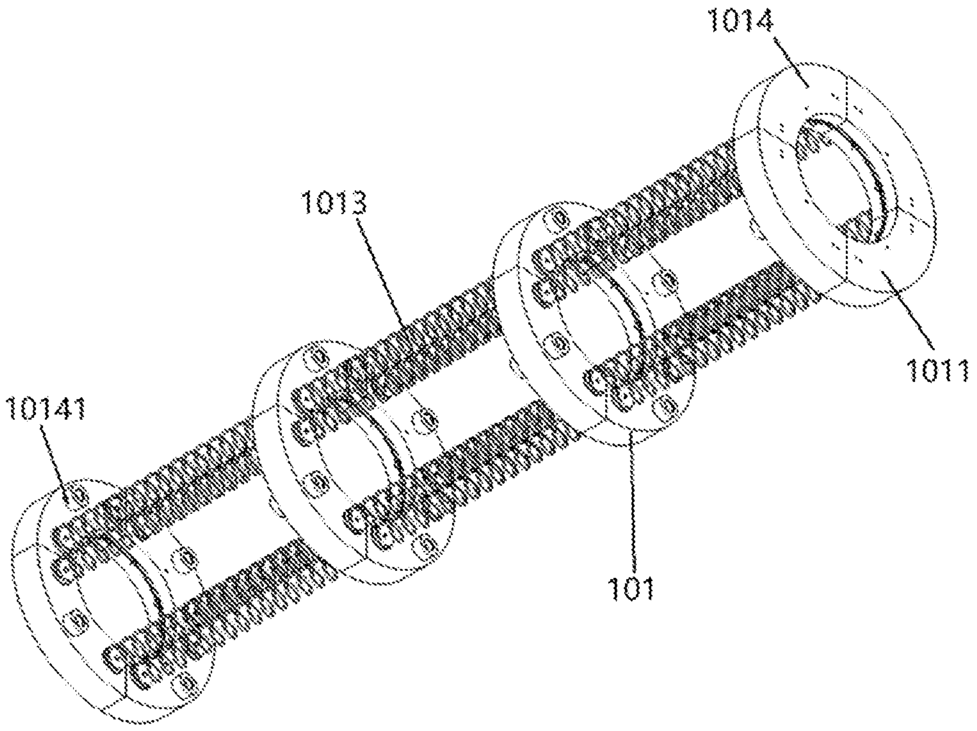
FIG. 3 illustrates a diagram of an initial state of the rigid-flexible coupled deformable bracket in the present disclosure (with no installation of rigid telescopic components).
Figure 4:
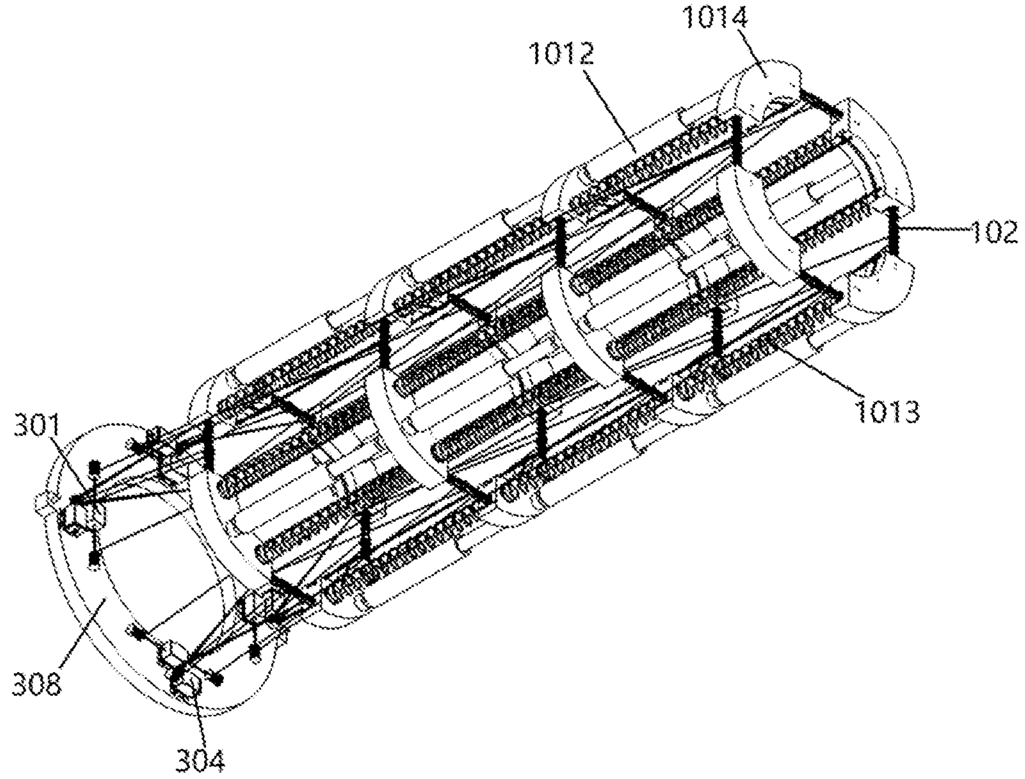
FIG. 4 illustrates a diagram of a state of expanding diameter of the rigid-flexible coupled deformable bracket in the present disclosure.
Figure 5:
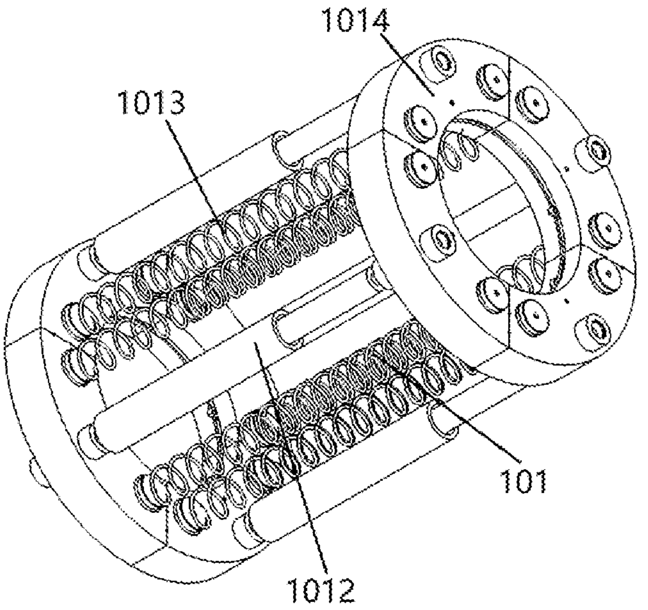
FIG. 5 illustrates a diagram of a structure of a connection between the adjacent rigid-flexible rigid ring bodies in the rigid-flexible coupled deformable bracket in the present disclosure.

As illustrated in FIG. 3, FIG. 4, and FIG. 5, the rigid-flexible coupled deformable bracket 1 includes the M-layered rigid ring body 1011 that is distributed in coaxial, where M≥2, and M=4 is taken an example for illustration in this embodiment. When the entire rigid-flexible coupled deformable bracket 1 is in an initial undeformed state, the four-layered rigid ring body 1011 is coaxially distributed in a straight line. Each layer of the four-layered rigid ring body 1011 is equally divided into the rigid sub-bodies 1014 with a number of N at an equal angle in a circumferential direction. N=4 is taken as an example for illustration in this embodiment. Therefore, each of the rigid sub-bodies 1014 is an arc-shaped body, and an arc angle of the arc-shaped body is 90 degrees, and the corresponding layer of the rigid ring body 1011 is formed by combining the four rigid sub-bodies 1014 in a circumferential direction. In other cases, N can also be set to other values as required, so that the arc angle of each of the rigid sub-bodies 1014 is 360 degrees/N.

Figure 6:
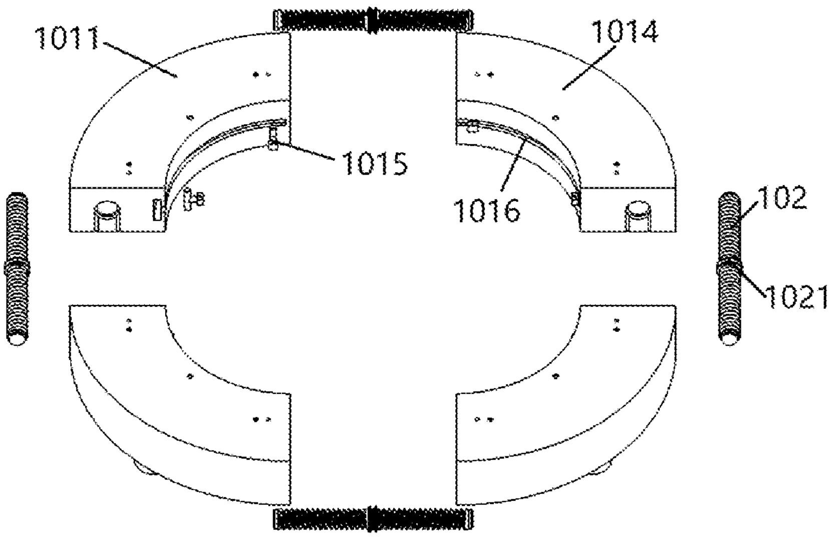
FIG. 6 illustrates a diagram of a structure of the rigid ring body in the rigid-flexible coupled deformable bracket in the present disclosure.

As illustrated in FIG. 6, at least one twin threaded rod 102 is arranged between arbitrary two adjacent rigid sub-bodies 1014 in the circumferential direction in each layer of the rigid ring body 1011. One twin threaded rod is taken as an example for illustration in this embodiment. A driven pulley 1021 is coaxially fixed at an intermediate position of each of the twin threaded rods 102, and the threads on the circumferential outer wall of the threaded rod 102 is divided into two threaded segments with the driven pulley 1021 as a boundary, and the rotating directions of the two threaded segments are opposite with each other. One threaded segment of each of the twin threaded rods 102 is threadedly installed inside one end of one corresponding rigid sub-body 1014, and the other threaded segment of each of the twin threaded rods 102 is threadedly installed inside one end of another corresponding rigid sub-body 1014.

Figure 7:
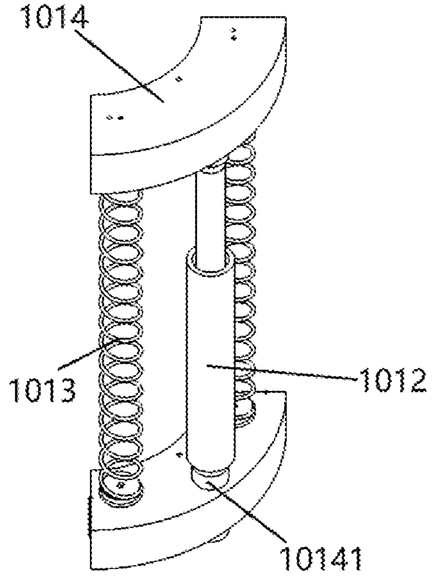
FIG. 7 illustrates a partial schematic diagram of a connection between the adjacent rigid sub-bodies in each sub-body group in the rigid-flexible coupled deformable bracket in the present disclosure.

As illustrated in FIG. 5 and FIG. 7, when the entire spray gun is in the initial undeformed state, the circumferential positions of each rigid sub-body 1014 in the four layers of the rigid ring body 1011 are in one-to-one correspondence, and four layers of rigid sub-bodies 1014 corresponding to the circumferential position are taken as a sub-body group, so that the sub-body groups of N=4 are obtained, and each of the sub-body groups includes four layers of the rigid sub-bodies 1014. In each of the sub-body groups, one rigid telescopic component 1012, and two elastic components 1013 are arranged between two adjacent layers of the rigid sub-bodies 1014. The rigid telescopic component 1012 is arranged at an intermediate position between the corresponding two adjacent layers of the rigid sub-bodies 1014, and the two elastic components 1013 are respectively located between the ends of the corresponding two adjacent layers of the rigid sub-body 1014.

Figure 8:
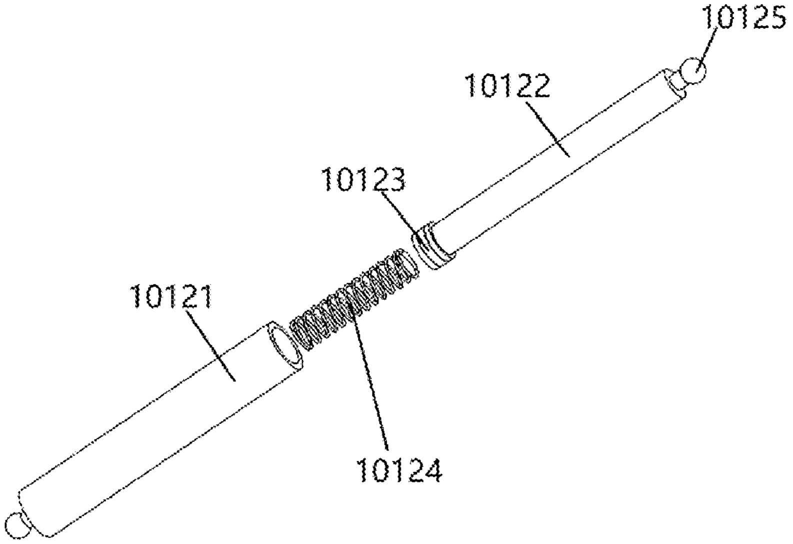
FIG. 8 illustrates a schematic diagram of a structure of the rigid telescopic component in the rigid-flexible coupled deformable bracket in the present disclosure.

As illustrated in FIG. 8, in this embodiment, the rigid telescopic component 1012 is a piston cylinder assembly. The piston cylinder assembly can be a structure that has the rigidity and is retractable such as a hydraulic piston cylinder, a pneumatic piston cylinder, a damping cylinder and a spring piston cylinder with a built-in spring. A spring-piston cylinder is taken as an example for illustration in this embodiment, but the piston cylinders with other structures should also be deemed to fall within the protection scope of the claims of the present disclosure. The rigid telescopic component 1012 includes a piston cylinder 10121, a piston rod 10122, a piston 10123, and a spring 10124. The piston 10123 is slidably installed inside the piston cylinder 10121. One end of the piston rod 10122 is entered inside the piston cylinder 10121 and is fixedly and coaxially connected to the piston 10123, and the other end of the piston rod 10122 is located outside the cylinder mouth of the piston cylinder 10121 as the penetrating-out end. One end of the spring 10124 is fixed on one side of the piston 10123 that is not connected to the piston rod 10122, and the other end of the spring 10124 is fixed on the cylinder block end of the piston cylinder 10121. In this embodiment, a boss 10141 is arranged at an intermediate position between two adjacent layers of rigid sub-bodies 1014 corresponding to the rigid telescopic component 1012, and a ball socket is arranged inside the boss 10141. The penetrating-out end of the piston rod 10122 and the cylinder block end of the piston cylinder 10121 in the rigid telescopic component 1012 are respectively rotatably equipped with the ball joints 10125, and the ball joints 10125 at both ends of the rigid telescopic component 1012 are respectively hinged in the ball sockets at the intermediate positions of the corresponding two adjacent layers of the rigid sub-bodies 1014.

In this embodiment, the elastic component 1013 is a high-rigidity spring, and both ends of the high-rigidity spring are respectively fixed at the corresponding end of the corresponding two adjacent layers of rigid sub-bodies 1014.

The rigid-flexible coupled elastic split-body 101 is formed after connecting the two adjacent layers of the rigid sub-bodies 1014 in each of the sub-body groups through one rigid telescopic component 1012 and two elastic components 1013. The first layer and the last layer of the rigid sub-bodies are respectively served as the ends of the corresponding rigid-flexible coupled elastic split-body 101.

In this embodiment, a total of four rigid-flexible coupled elastic split-bodies 101 are obtained, and the four rigid-flexible coupled elastic split-bodies 101 are combined in the circumferential direction to form a circular ring column structure. Since two adjacent layers of the rigid sub-bodies 1014 in each of the rigid-flexible coupled sub-bodies 101 are connected to each other through one rigid telescopic component 1012 and two elastic components 1013, each of the rigid-flexible coupled elastic split-bodies 101 is elastically retractable in the axial direction. When the rigid-flexible coupled elastic split-body 101 is extended in the axial direction, the rigid telescopic component 1012 and the elastic components 1013 are all stretched, and when the rigid-flexible coupled elastic split-body 101 is contracted in the axial direction, the rigid telescopic component 1012 and the elastic components 1013 are all contracted. When the four rigid-flexible coupled elastic split-bodies 101 are elastically extended as a whole in the axial direction, the rigid-flexible coupled deformable bracket 1 is deformed in extending as whole, and when the four rigid-flexible coupled elastic split-bodies 101 are elastically contracted as a whole in the axial direction, the rigid-flexible coupled deformable bracket 1 is deformed in contracting as a whole. Therefore, in this embodiment, the rigid-flexible coupled deformable bracket 1 has the ability to deform in telescoping in the axial direction, and the rigid-flexible coupled deformable bracket 1 is restored to the original shape by utilizing the elastic forces of the spring 10124 inside the rigid telescopic component 1012 and the elastic components 1013 in the rigid-flexible coupled elastic split-body 101.

The elastic components 1013 between two adjacent layers of the rigid sub-bodies 1014 in each of the rigid-flexible coupled elastic split-bodies 101 is deformable in bending, and the rigid telescopic component 1012 between the two adjacent layers of the rigid sub-bodies 1014 is connected to the rigid sub-body 1014 by the ball hinge, and therefore, each of the rigid-flexible coupled elastic split-bodies 101 is capable of elastic bending. When the rigid-flexible coupled elastic split-body 101 is elastically bent, the elastic components 1013 are in a bent state, and the rigid telescopic component 1012 is in a inclined state through the ball joint. Therefore, in this embodiment, the rigid-flexible coupled deformable bracket 1 has the ability to deform in bending. and the rigid-flexible coupled deformable bracket 1 is restored to the original shape by utilizing the elastic force of the elastic component 1013 in the rigid-flexible coupled elastic split-body 101.

In summary, in this embodiment, each of the rigid-flexible coupled elastic bodies 101 has the ability to restore the original shape under the action of the elastic force. Therefore, in this embodiment, the rigid-flexible coupled deformable bracket 1 has the ability to restore the original shape.

In this embodiment, when the twin threaded rod 102 between the adjacent rigid sub-bodies 1014 in each of the rigid ring body 1011 is rotated, the two adjacent rigid sub-bodies 1014 are respectively moved away from or approximate to a central axis of the rigid ring body 1011, so that the corresponding rigid ring body 1011 is expanded or contracted in diameter. When all the rigid ring bodies 1011 are expanded or contracted in diameter simultaneously, all the rigid-flexible coupled elastic split-bodies 101 are moved away from or approximate to the central axis of the circular ring column structure, and the rigid-flexible coupled deformable bracket 1 is deformed as a whole in a diameter-expanding or diameter-contracting manner, so that the area of the radial section of the rigid-flexible coupled deformable bracket 1 can be changed. Through the above-mentioned process, the deformation with the variable cross-sectional area of the rigid-flexible coupled deformable bracket 1 and the restoration of the original shape of the rigid-flexible coupled deformable bracket 1 can be implemented in this embodiment.

In this embodiment, the spray head assembly 2 includes a spray head plate 201 as a nozzle installation component, a plurality of nozzles 202 are arranged on one plate surface of the spray head plate 201 which is served as a working surface, a plurality of paint inlets 203 are arranged on the other plate surface of the spray head plate 201 which is served as an installing surface. A plurality of flow channels are arranged inside the spray head plate 201. The number of the nozzles 202, the paint inlets 203, and the flow channels are the same. The nozzles 202 are in communication with the paint inlets 203 through the flow channels inside the spray head plate 201 in one-to-one correspondence. The spray head plate 201 is located outside the first layer of the rigid ring body 1011 in the rigid-flexible coupled deformable bracket 1, that is, the spray head plate 201 is located outside the first layer of the rigid sub-body 1014 in each of the rigid-flexible coupled elastic split-bodies 101. The first layer of the rigid sub-body 1014 in each of the rigid-flexible coupled elastic split-bodies 101 is respectively connected to the installing surface of the spray head plate 201 through the first guide rail pair 401 which is served as a moving support, and the corresponding rigid-flexible coupled elastic split-body 101 is supported by the first guide rail pair 401 to move away from or approximate to the central axis of the circular ring column structure.

Figure 10:
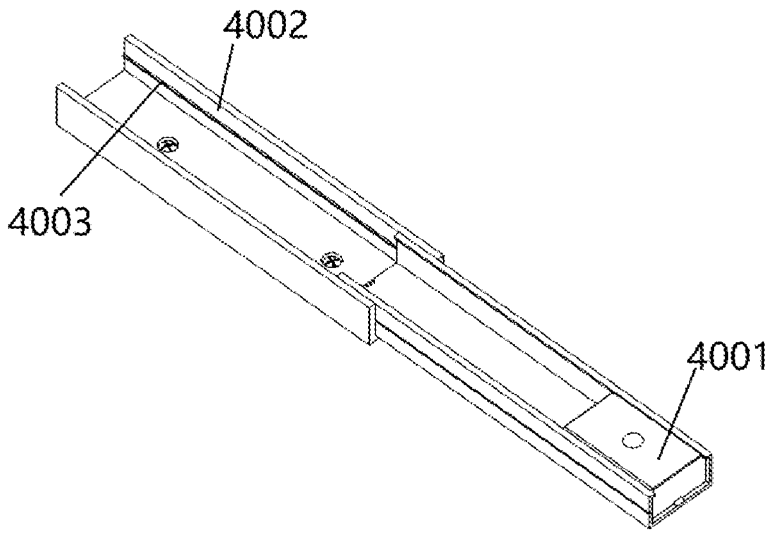
FIG. 10 illustrates a schematic diagram of a structure of the first guide rail pair in the spray gun of the present disclosure.
Figure 11:
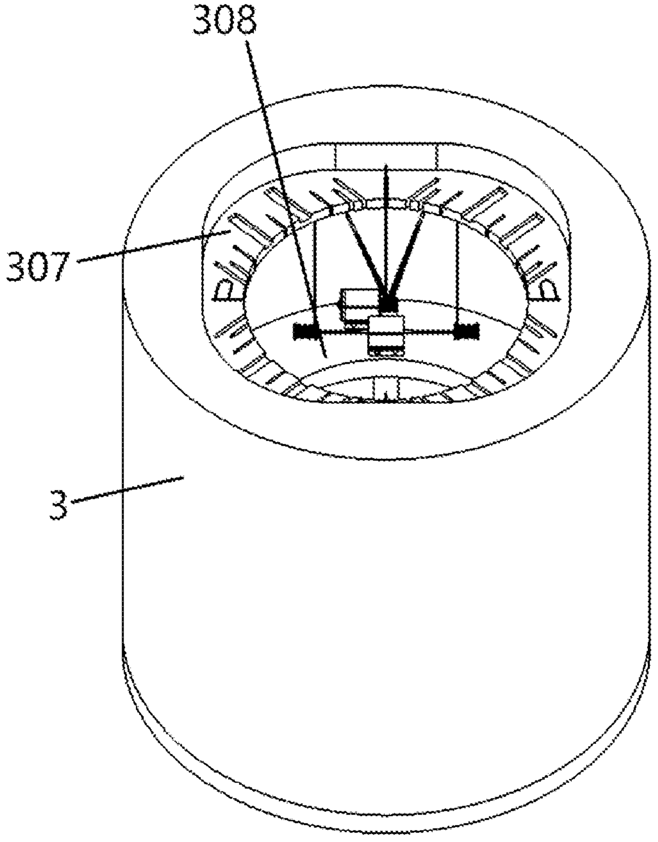
FIG. 11 illustrates a schematic diagram of a structure of the spray gun base in the spray gun of the present disclosure.

As illustrated in FIG. 10, specifically, the first guide rail pair 401 includes a slider 4001 and a guide rail 4002. The guide rail 4002 is a multi-stage guide rail. The up-one-stage guide rail in the multi-stage guide rail is embedded and slidably installed into the subsequent-stage guide rail, the slider 4001 is slidably installed in the upper-most-stage guide rail in the multi-stage guide rail. The first guide rail pair 401 has a sufficient movement stroke and implements the infinite sliding through the multi-stage guide rail structure. In this embodiment, the slider 4001 in the first guide rail pair 401 is fixed on the end face of the first layer of the rigid sub-body 1014 in the corresponding rigid-flexible coupled elastic split-body 101, and the lowest-stage guide rail in the guide rail 4002 is fixed on the installing surface of the spray head plate 201, and the direction of the guide rail in each of the first guide rail pairs 401 is parallel to the movement direction of the corresponding rigid sub-body 1014.

As an improvement on the first guide rail pair 401 in this embodiment, each stage of the guide rail in the first guide rail pair 401 in this embodiment is a groove structure. The upper-one-stage guide rail is embedded and slidably installed into the subsequent-stage guide rail, and the slider 4001 is slidably installed in the groove of the upper-most guide rail. The two inner surfaces of the subsequent-stage guide rail are respectively provided with the guide edges 4003 parallel to the guide rail, and the two outer surfaces of the upper-one-stage guide rail are respectively provided with the guide slots parallel to the guide rail. When the upper-one-stage guide rail is embedded and slidably installed in the subsequent-stage guide rail, the guide edges 4003 of the inner surfaces of the subsequent-stage guide rail are inserted into the guide slots of the outer surfaces of the upper-one-stage guide rail, thereby playing a guiding role between the adjacent guide rails.

As an improvement on the first guide rail pair 401 in this embodiment, a limiting block is arranged on a bottom part of the upper-one-stage guide rail of the first guide rail pair 401 in this embodiment. A limiting long slot parallel to the guide rail is arranged at a bottom of the groove of the subsequent-stage guide rail. When the upper-one-stage guide rail is embedded and slidably installed into the subsequent-stage guide rail, the limiting block on the bottom part of the upper-one-stage guide rail is slidably assembled into the limiting long slot at the bottom of the groove of the subsequent-stage guide rail, so that merely one part of the upper-one-stage guide rail is protruded out from the subsequent-stage guide rail through the cooperation between the limiting long slot and the limiting block, and the upper-one-stage guide rail cannot be separated from the subsequent-stage guide rail.

As an improvement on the first guide rail pair 401 in this embodiment, a limiting long slot parallel to the guide rail is arranged at the bottom of the groove of the upper-most-stage guide rail in this embodiment, and a limiting block is arranged on a bottom part of the slider 4001. When the slider 4001 is slidably installed in the groove of the upper-most-stage guide rail, the limiting block on the bottom part of the slider 4001 is slidably installed into the limiting groove at the bottom of the groove of the upper-most-stage guide rail, so that the slider 4001 can only slide in the upper-most-stage guide rail through the cooperation between the limiting long slot and the limiting block.

In this embodiment, the spray gun base 3 is a cylindrical structure, and an opening of the cylindrical structure is served as an installation port. A guide rail pair installation ring plate 307 is fixed in the installation port, and a driving paint supply installation ring plate 308 is fixed at a position inside the cylindrical structure below the guide rail pair installation ring plate 307. In the rigid-flexible coupled deformable bracket 1, the last layer of the rigid ring body 1011 is protruded into the installation port of the spray gun base 3, that is, the last layer of the rigid sub-body 1014 in each of the rigid-flexible coupled elastic split-bodies 101 is protruded into the installation port of the spray gun base 3. The last layer of the rigid sub-body 1014 in each of the rigid-flexible coupled elastic split-bodies 101 is respectively connected to the guide rail pair installation ring plate 307 through the second guide rail pair 402 which is served as a moving support, and the corresponding rigid-flexible coupled elastic split-body 101 is supported by the second guide rail pair 402 to move away from or approximate to the central axis of the circular ring column structure. In this embodiment, the structure of the second guide rail pair 402 is exactly the same as that of the first guide rail pair 401. The slider of the second guide rail pair 402 is fixed on the end face of the last layer of the rigid sub-body 1014 in the corresponding rigid flexible coupled elastic split-body 101, and the lowest-stage guide rail of the second guide rail pair 402 is fixed to the guide rail pair installation ring plate 307, and the direction of the guide rail of each of the second guide rail pairs 402 is parallel to the movement direction of the corresponding rigid sub-body 1014.

This embodiment further includes a flexible drive unit configured to drive the rigid-flexible coupled deformable bracket 1 to deform, and a rotating drive unit.

As illustrated in FIGS. 12, 13, 14, and 15, the flexible drive unit includes the dual-output motors 301 of N=4. Four dual-output motors 301 are distributed in a circumferential direction, and the positions of the dual-output motors are in one-to-one correspondence with the positions between two circumferentially adjacent rigid-flexible coupled elastic split-bodies 101. A wire winder 302 is fixedly installed on the two output shafts of each of the dual-output motors 301 respectively, and a rope 303 served as a flexible connector is wound on each of the wire winders 302 respectively. A first rope 303 corresponding to each of the dual-output motors 301 is passed through the corresponding end of the last layer of the rigid sub-body 1014 in the corresponding one of the rigid-flexible coupled elastic split-bodies 101, then passed through the corresponding ends of another two layers of the rigid sub-body 1014 in the corresponding one of the rigid-flexible coupled elastic split-bodies 101, and eventually the end of the first rope 303 is fixed to the head end of the corresponding one of the rigid-flexible coupled elastic split-bodies 101, that is, the end of the first rope 303 is fixed to the first layer of the rigid sub-body 1014. Similarly, a second rope corresponding to each of the dual-output motors 301 is passed through the corresponding end of the last layer of the rigid sub-body 1014 in another corresponding rigid-flexible coupled elastic split-body 101, and then is passed through the corresponding ends of another two layers of the rigid sub-bodies 1014 in another corresponding rigid-flexible elastic split-body 101, and eventually the end of the second rope is fixed to the head end of the another corresponding rigid-flexible coupled elastic split-body 101, that is, the end of the second rope is fixed to the end of the first layer of the rigid sub-body 1014. And each of the ropes 303 is passed through the spring at the end position of the corresponding rigid sub-body 1014.

In this embodiment, the dual-output motors 301 are the motors with rotatable and telescopic output shafts. When each of the dual-output motor 301 is operated to retract the ropes, the ends of the first layers of the rigid sub-bodies 1014 in the corresponding two rigid-flexible coupled elastic split-bodies 101 are pulled by the ropes 303. Therefore, when all the dual-output motors 301 are operated synchronously, the first layers of the rigid sub-bodies 101 in all of the rigid-flexible coupled elastic split-bodies 101 are pulled to enable all the rigid-flexible coupled sub-bodies 101 to deform in axial elastic contraction, thereby implementing the axial contraction of the rigid-flexible coupled deformable bracket 1. When the ropes are released by the dual-output motors 301, the first layer of the rigid sub-body 1014 in each of the rigid-flexible coupled elastic split-bodies 101 is not affected by the pulling force of the ropes. At this time, each of the rigid-flexible coupled elastic split-bodies 101 is restored to the original shape by utilizing the elastic forces of the spring 10124 inside the rigid telescopic component 1012 and the elastic component 1013 in each of the rigid-flexible coupled elastic split-bodies 101, which enables the rigid-flexible coupled deformable bracket 1 to restore to the original shape. Based on the above way, the rigid-flexible coupled deformable bracket 1 is driven by the flexible drive unit to implement the telescopic deformation and return to the original shape.

In this embodiment, when one, or two, or three of the dual-output motors 301 are operated to retract the rope, the first layer of the rigid sub-body 1014 in the corresponding rigid-flexible coupled elastic split-body is pulled by the rope 303. Therefore, when one, or two, or three dual-output motors 301 are operated synchronously, the corresponding rigid-flexible coupled elastic split-body 101 is deformed in elastic contraction, while the rigid-flexible coupled elastic split-bodies 101 that have not been pulled by the ropes are passively deformed in elastic bending, which enables the rigid-flexible coupled deformable bracket 1 to deform in bending at this time. When the rope is released by the dual-output motor 301 that has retracted the rope before, each of the rigid-flexible coupled elastic split-bodies 101 that has been elastically contracted and deformed before is restored to the original shape, while the rigid-flexible coupled elastic split-bodies 101 that have been elastically bent and deformed passively before are also restored to the original shapes, which enables the rigid-flexible coupled deformable bracket 1 is restored to the original shape. Based on the above way, the rigid-flexible coupled deformable bracket 1 is driven by the flexible driving unit to implement the bending deformation and restored to the original shape.

As illustrated in FIG. 12, FIG. 13, FIG. 14, and FIG. 16, the rotating drive unit includes four single-output motors 304. The four single-output motors 304 are distributed in a circumferential direction, and the positions of the motors are in one-to-one correspondence with the positions between two circumferentially adjacent rigid-flexible coupled elastic split-bodies 101. A driving pulley 305 is fixedly installed on the output shaft of each of the single-output motors 304 respectively. Four wheel grooves are arranged on each of the driving pulleys 305, and circular transmission belts 306 with rough surface served as the transmission components are installed in the four wheel grooves respectively. The lengths of the four circular transmission belts 306 with rough surface corresponding to each of the driving pulleys 305 are different with each other. The four circular transmission belts with rough surface and different lengths corresponding to each of the driving pulleys 305 are respectively configured to connect to the driven pulleys 1021 on the four twin threaded rods 102 that are located in different layers between the two adjacent rigid-flexible coupled elastic split-bodies 101 corresponding to the driving pulley 305 in one-to-one correspondence. Specifically, the other end of the shortest circular transmission belt with rough surface in the four circular transmission belts with rough surface corresponding to each of the driving pulleys 305 is directly wound in the rolling groove in the driven pulley 1021 of the twin threaded rod that is located in the last layer between the two adjacent rigid-flexible coupled elastic split-bodies 101 corresponding to the driving pulley 305, the second shortest circular transmission belt with rough surface is passed through the through-hole in the last layer of the rigid sub-body in the two adjacent rigid-flexible coupled elastic split-bodies 101 corresponding to the driving pulley 305 to connect to the twin threaded rod located in the second layer, and so on, the transmission belts with different lengths are connected to the twin threaded rods 102 located in different layers between the two corresponding adjacent rigid-flexible coupled elastic split-bodies 101. Therefore, each of the driving pulleys 305 are in transmission-connection with the four twin threaded rods 102 between the two adjacent rigid-flexible coupled elastic split-bodies 101 corresponding to the driving pulleys 305 through the four transmission belts 306 with different lengths, and the corresponding four twin threaded rods 102 are driven by each of the single-output motors 304 through the driving pulley 305 and the four transmission belts 306 to rotate.

In this embodiment, when the four single-output motors 304 are operated synchronously, which enables all the twin threaded rods 12 to rotate. Therefore, each of the rigid sub-bodies 1014 in each layer of the rigid ring body 1011 is expanded or contracted in diameter, that is, each of the rigid-flexible coupled elastic split-bodies 101 is moved away from or approximate to the central axis of the circular ring column structure, so that the rigid-flexible coupled deformable bracket 1 is deformed as a whole in a diameter-expanding or contracting-diameter manner, thereby implementing the deformation with the variable cross-section area of the rigid-flexible deformable bracket 1 and the restoration of the original shape of the rigid-flexible deformable bracket 1. When the rigid-flexible coupled deformable bracket 1 is deformed in a diameter-expanding or diameter-contracting manner, since the dual-output motors 301 are the motors with rotatable and telescopic output shafts, the output shafts of the dual-output motors 301 can be expanded and contracted accordingly, so that the dual-output motors 301 cannot be interfered by the deformation of the rigid-flexible coupled deformable bracket 1 with diameter expansion or diameter contraction.

In this embodiment, the paint supply assembly, each of the dual-output motors 301 in the flexible drive unit, and each of the single-output motors 304 in the rotating drive unit are all installed on the drive paint supply installation ring plate 308 in the spray gun base 3. And the guide rail pair installing ring plate 307 in the spray gun base 3 is provided with a notch, which is utilized for the rope 303 wound on the dual-output motor 301 in the flexible drive unit and the transmission belt 306 wound on the sing-output motor 304 in the rotating drive unit to pass through.

Figure 12:
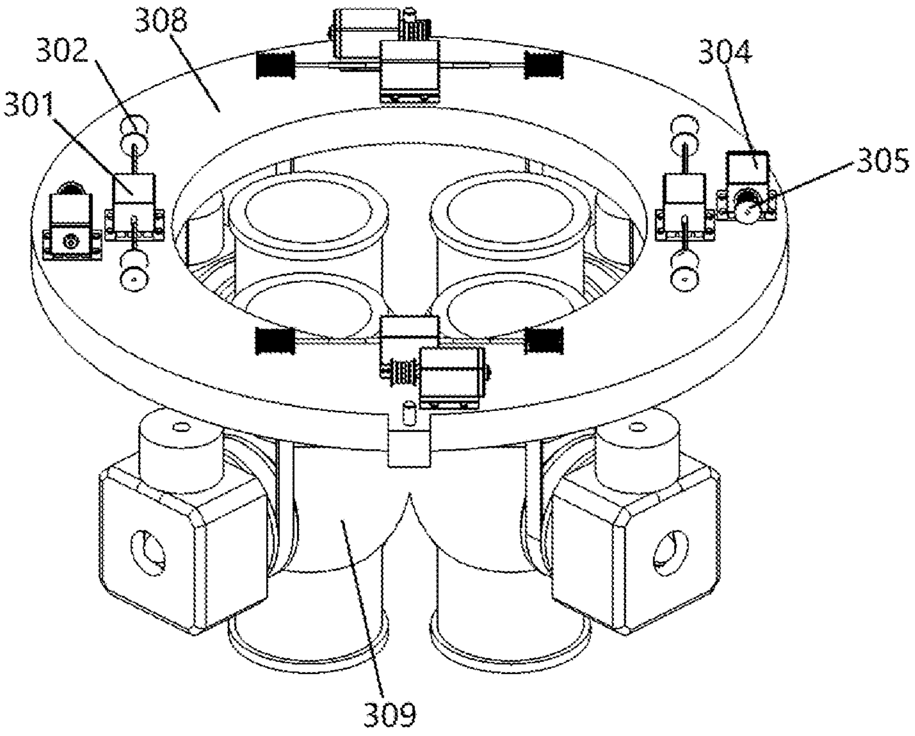
FIG. 12 illustrates a schematic diagram of an installation structure of the drive paint supply installation ring plate in the spray gun of the present disclosure.
Figure 13:
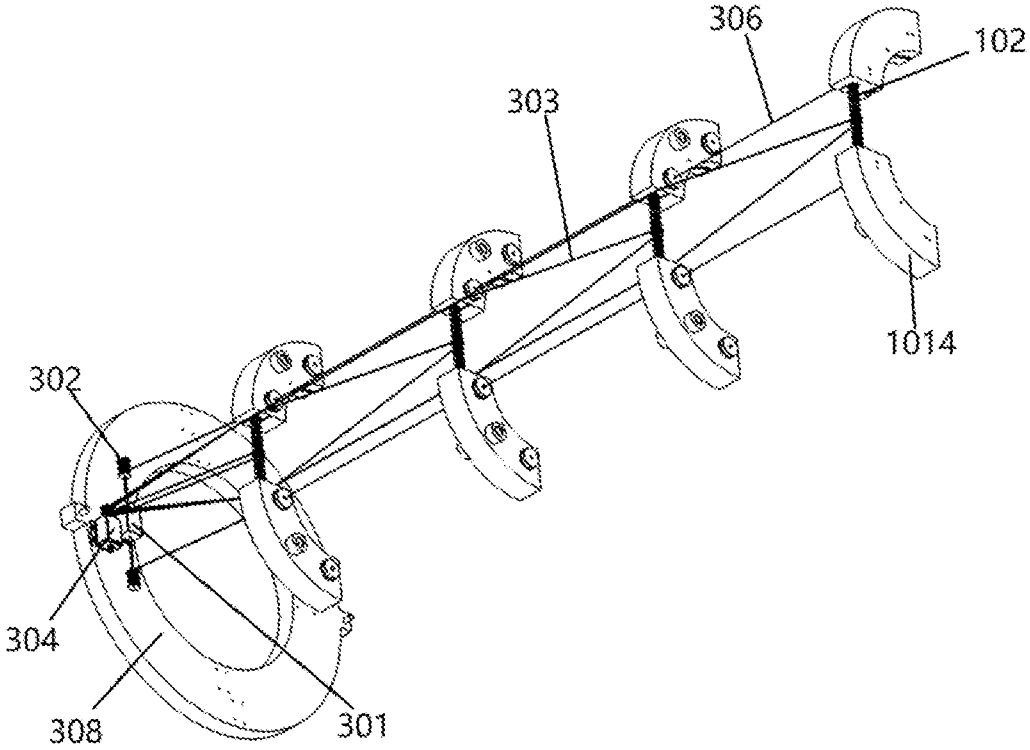
FIG. 13 illustrates a partial schematic diagram of a connection structure of the drive unit in the rigid-flexible coupled deformable bracket of the present disclosure.
Figure 14:
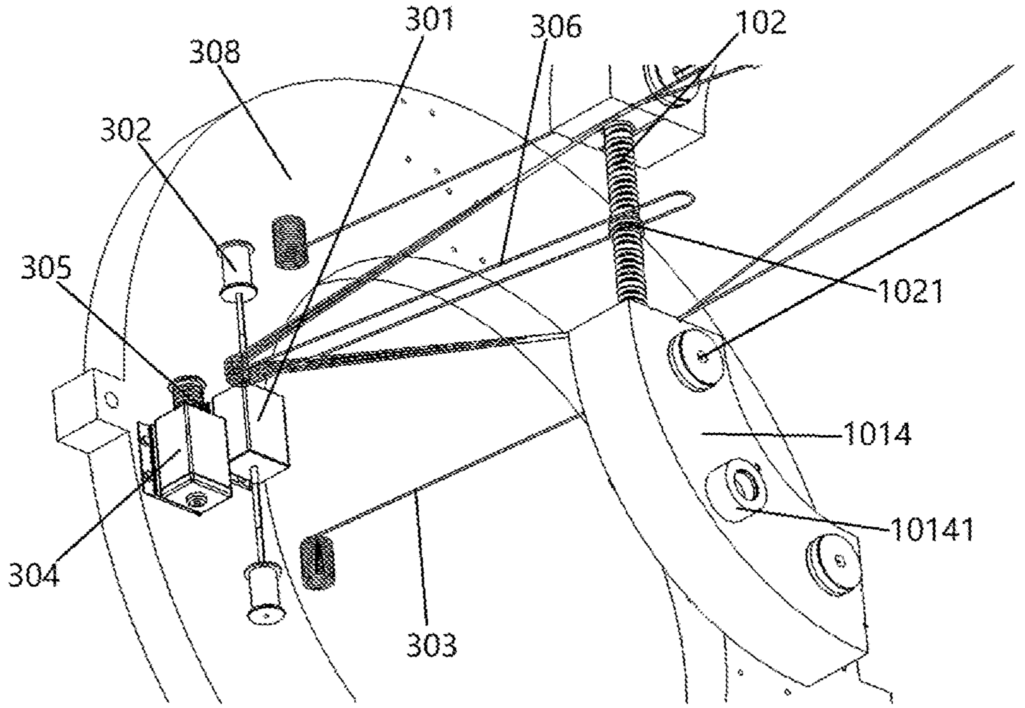
FIG. 14 illustrates a partial enlarged view of a connection structure of the drive unit in the rigid-flexible coupling deformable bracket of the present disclosure.
Figure 15:
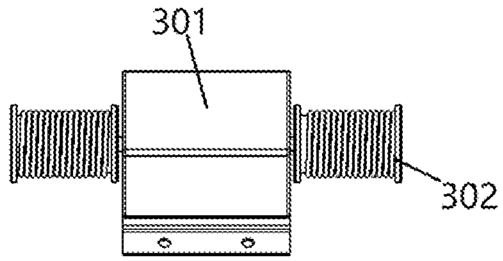
FIG. 15 illustrates a schematic diagram of a structure of a dual-output motor in the present disclosure.
Figure 16:
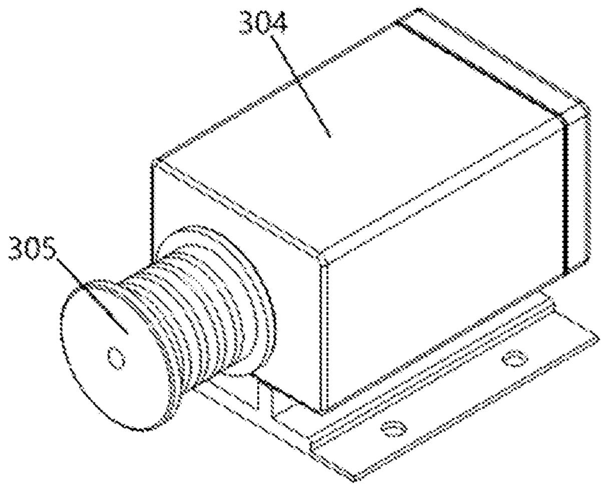
FIG. 16 illustrates a schematic diagram of a structure of a single-output motor in the present disclosure.

As illustrated in FIG. 1, FIG. 2, and FIG. 12, in this embodiment, the paint supply assembly includes solenoid valves 309 fixed on the driving paint supply installation ring plate 308. The inlet end of the solenoid valve 309 is configured to connect to the external paint liquid paint supply pump, and the outlet end of the solenoid valve 309 is connected with the elastic paint supply pipe 5. The orifice of the elastic paint supply pipe 5 is abutted and in contact with the installing surface of the spray head plate 201 in the spray head assembly 2, and covered and in communication with a plurality of the paint inlets 203 at the intermediate area of the installing surface, after the elastic paint supply pipe 5 is penetrated the area surrounded by the rigid-flexible coupled deformable bracket 1. The paint liquid output by the external paint liquid supply pump is delivered to the nozzle 202 through the solenoid valve 309 and the elastic paint supply pipe 5.

As illustrated in FIG. 1, FIG. 2, and FIG. 6, in this embodiment, the circumferential outer surface of the elastic paint supply pipe 5 is connected to the inner surface of each of the rigid-flexible coupled elastic split-bodies 101 through the connector 1015. Specifically, in each of the rigid-flexible coupled elastic split-bodies 101, the inner surface of each of the rigid sub-bodies 1014 (that is, the inner arc surface facing towards the center) is served as the inner surface of the rigid-flexible coupled elastic split-body 101, and the inner surface of each of the rigid sub-bodies 1014 is connected to the circumferential outer surface of the elastic paint supply pipe 5 through the connector 1015. Therefore, when each of the rigid-flexible coupled elastic split-bodies 101 is moved away from or approximated to the central axis of the circular ring column structure, the circumferential outer surface of the elastic paint supply pipe 5 is pulled to enable the elastic paint supply pipe 5 to deform in diameter expansion or diameter contraction. When the diameter of the elastic paint supply pipe 5 is changed, the flow rate inside the elastic paint supply pipe 5 is changed, the area covered by the orifice of the elastic paint supply pipe 5 is changed, and the number of the paint inlets 203 covered by the orifice of the elastic paint supply pipe 5 is changed, so that the paint liquid delivery volume is controlled, thereby controlling the spray width of the spray gun.

As a further improvement on this embodiment, an arc-shaped slideway 1016 is arranged on the inner surface of each of the rigid sub-bodies 1014 in each of the rigid-flexible coupled elastic split-bodies 101. Therefore, the four-layered slidway 1016 is formed in the inner surface of each of the rigid-flexible coupled elastic split-bodies 101 along an axial direction, and at least one connector 1015 is slidably assembled in each layer of the slideway 1016, and each layer of the connector 1015 is fixedly connected to the circumferential outer surface of the elastic paint supply pipe 5. In this way, the connector 1015 is modified to be a slidable connector, such that the problem of the damage to the side wall of the elastic paint supply pipe 5 caused by the pulling forces totally concentrated on the connecting point of the elastic supply paint pipe 5 is prevented through the sliding of connector 1015 during the radial deformation of the elastic paint supply pipe 5.

Figure 9:
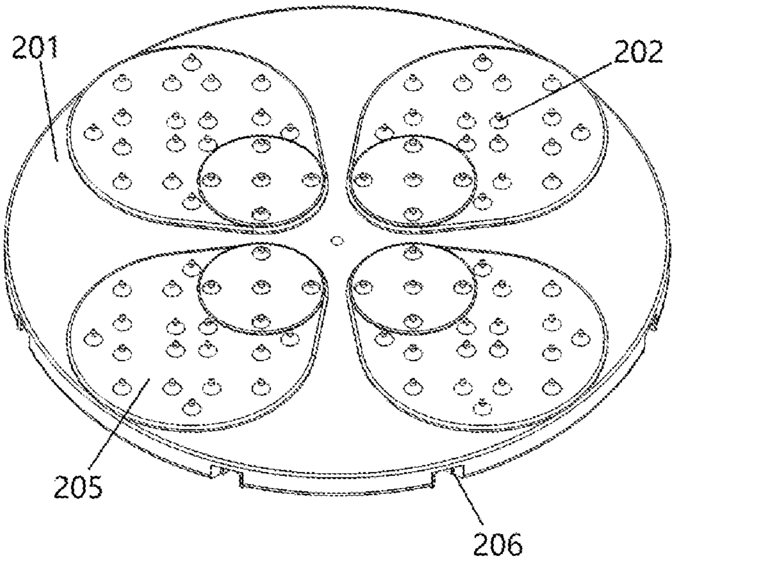
FIG. 9 illustrates a schematic diagram of a structure of a spray head assembly in the spray gun of the present disclosure, wherein (a) illustrates a top view, and (b) illustrates a bottom view.
Figure 9:
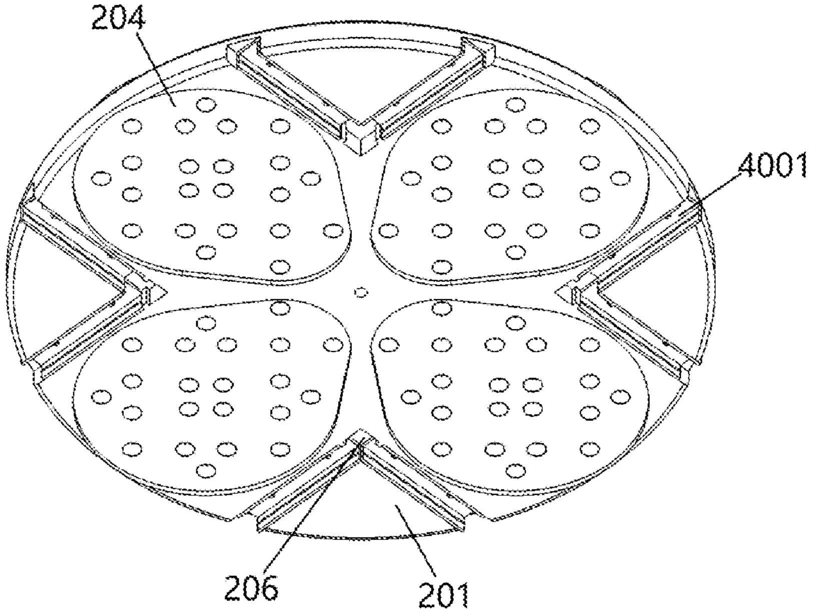

As illustrated in FIG. 9, as a further improvement on this embodiment, the working surface of the spray head plate 201 in this embodiment is divided into the painting areas of N=4 along the circumferential direction. Each of the painting areas is a spindle-shaped protrusion 205. A plurality of nozzles 202 are arranged on each of the spindle-shaped protrusions 205. A spindle-shaped groove 204 is arranged at a position of the installing surface of the spray head plate 201 corresponding to each of the spindle-shaped protrusions 205. A plurality of the paint inlets 203 are arranged in each of the spindle-shaped grooves 204. Each of the nozzles 202 in each of the spindle-shaped protrusions 205 is in communication with the paint inlet 203 in the corresponding spindle-shaped groove 204 in one-to-one correspondence. A installing groove 206 is arranged at a position on the installing surface of the spray head plate 201 excluding the position where the spindle-shaped grooved 204 is located, and configured to install the guide rail 4002 of the first guide rail pair 401. Four elastic paint supply pipes 5 are provided, the orifices of the four elastic paint supply pipes 5 are in contact with the spindle-shaped grooves 204 on the installing surface of the spray head plate 201 in one-to-one correspondence, and the orifice area of each of the elastic paint supply pipes 5 is covered and in communication with parts of the paint inlets 203 in the corresponding spindle-shaped groove 204. The inner surfaces of the four rigid-flexible coupled elastic split-bodies 101 are connected to the circumferential outer surfaces of the four elastic paint supply pipes 5 through the connectors 1015 in one-to-one correspondence, and the circumferential outer surfaces of the adjacent elastic paint supply pipes 5 are connected to each other by the hanging lugs and the ropes, so that four elastic paint supply pipes 5 are connected to each other in parallel. Four electromagnetic valves 309 corresponding to the four elastic paint supply pipes 5 are similarly provided, the paint liquids of different colors are delivered to four painting areas through the four electromagnetic valves 309, and an arbitrary one of the rigid-flexible coupled elastic split-bodies is adjusted to move, which changes the diameter of the corresponding elastic paint supply pipe 5, so that the spray width is changed, thereby enabling the spray gun to spray more carefully on the edges or details of the pattern, and implementing the fine control of the color.

Embodiment Two

Figure 17:
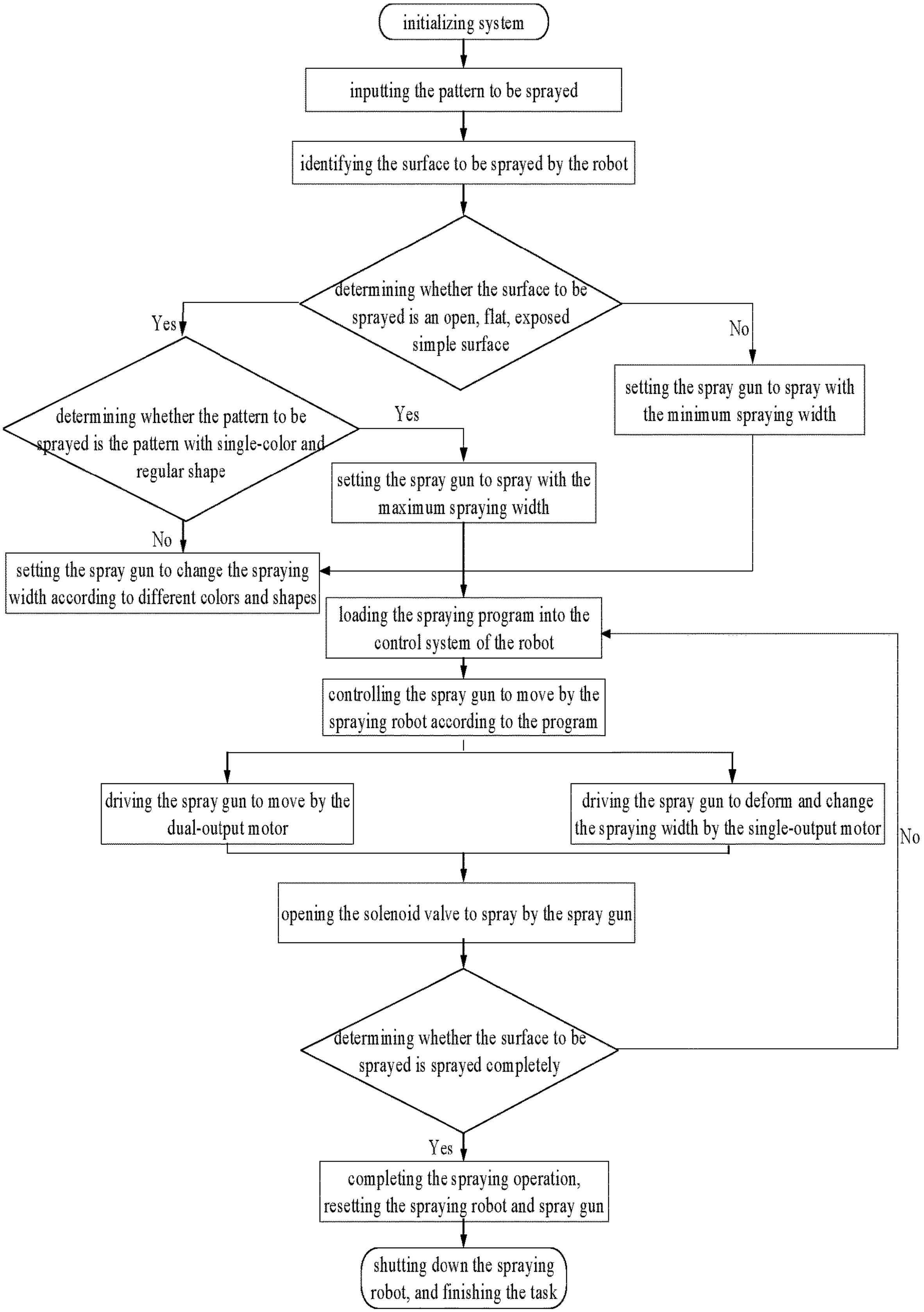
FIG. 17 illustrates a flow chart of an operation method for the spray gun in the present disclosure.

As illustrated in FIG. 17, an operating method for the rigid-flexible coupled multi-hole spray gun device with variable size for the spraying robot described in the above embodiment one is disclosed in this embodiment. The operating method includes the following step.

In Step 1, the spray gun is installed at the end of the spraying robot. In Step 2, the pattern to be sprayed is imported into the spraying robot system.

In Step 3, the surface features of the workpiece to be sprayed is scanned and identified to determine whether the surface to be sprayed is a simple scene or not.

In Step 4, the subsequent step is set according to the conditions of the surface to be sprayed. When the surface to be sprayed is an open, flat, and exposed relatively simple surface, the size of the spray gun is not limited, and the pattern to be sprayed is further determined whether to be the pattern with single color and regular shape. When the pattern is simple, then the spray gun is directly set to adopt the maximum diameter for spraying with the highest efficiency. When the pattern is complex, that is, the pattern with multiple colors and shapes, then the spray gun is set to change the spraying width according to different colors and shapes. When the surface to be sprayed is a narrow corner or an inner cavity, then the spray gun is set to adopt the minimum size for spraying, such that the spray gun can reach the position to be sprayed.

In Step 5, the set spraying program is loaded by the control system of the spraying robot.

1. The spray gun is driven by the motor according to the loaded program. The dual-output motors 301 are started to drive the winders 302 to rotate, and the forces of different magnitudes and directions are applied to the rigid-flexible coupled elastic split-bodies 101 by the four dual-output motors 301 through the ropes 303 fixed on the winder 302 in four directions, such that the rigid-flexible coupled elastic split-body 101 is driven for telescoping, thereby controlling the entire rigid-flexible coupled deformable bracket 1 of the spray gun to move in bending and telescoping.

2. The single-output motors 304 are started to drive the driving pulleys 305 to rotate and drive the transmission belts 306 to move, which drives the twin threaded rods 102 to rotate, and drives the rigid-flexible coupled elastic split-bodies 101 to move away from or approximate to the central axis of the circular ring column structure, and further adjusts radial size of the rigid-flexible coupled deformable bracket 1, so that the thickness and the spraying width of the spray gun can be changed.

3. The spray gun is controlled by the control system to open the solenoid valves 309 to start the spraying operation according to the planned spraying trajectory.

4. The solenoid valves 309 are closed after the spraying operation is completed, and the spraying robot and spray gun are reset.

The preferred embodiments of the present disclosure have been described in detail above with referent to the accompanying drawings. The embodiments described in the present disclosure are merely the descriptions of the preferred embodiments of the present disclosure, and are not intended to limit the concept and the scope of the present disclosure. The various specific technical features described in the above specific embodiments can be combined in an suitable way without contradiction. As long as such a combination does not violate the idea of the present disclosure, it should also be regarded as the contents disclosed in the present disclosure. In order to avoid unnecessary repetition, various possible combinations are not further described in the present disclosure.

The present disclosure is not limited to the specific details in the above-mentioned embodiments. Within the scope of the technical concept of the present disclosure and without departing from the design concept of the present disclosure, various modifications and improvements made by those skilled in the art should fall within the protection scope of the present disclosure. The technical content claimed in the present disclosure has been fully recorded in the claims.

What is claimed is:

1. A rigid-flexible coupled multi-hole spray gun device with variable size for a spraying robot, comprising a rigid-flexible coupled deformable bracket, a spray head assembly, a spray gun base, and further including a paint supply assembly, wherein the rigid-flexible coupled deformable bracket includes rigid-flexible coupled elastic split-bodies with a number of N, N>2, the N rigid-flexible coupled elastic split-bodies are distributed along a circumferential direction, and a twin threaded rod is arranged between two adjacent rigid-flexible coupled elastic split-bodies along a circumferential direction, threads of the twin threaded rod are divided into two threaded segments with opposite rotating directions, the two threaded segments of the twin threaded rod are rotatably installed in the two corresponding rigid-flexible coupled elastic split-bodies respectively, and one end of each of the rigid-flexible coupled elastic split-bodies in a same direction is respectively connected to the spray gun base through a first guide rail pair, each of the rigid-flexible coupled elastic split-bodies is restored to an original shape of the rigid-flexible coupled elastic split-body under an elastic action, the rigid-flexible coupled deformable bracket is restored to an original shape of the rigid-flexible coupled deformable bracket as a whole, when the twin threaded rod is rotated, the two corresponding rigid-flexible coupled elastic split-bodies are moved away from a central axis of the rigid-flexible coupled deformable bracket or approximate to the central axis of the rigid-flexible coupled deformable bracket;

the spray head assembly includes a plurality of nozzles and nozzle installation components configured to install the nozzles, in the rigid-flexible coupled deformable bracket, another end of each of the rigid-flexible coupled elastic split-bodies in a same direction is connected to the nozzle installation component through a second guide rail pair; and the paint supply assembly is configured to deliver spray paint to the nozzles in the spray head assembly.

2. The rigid-flexible coupled multi-hole spray gun device with variable size for the spraying robot according to claim 1, the rigid-flexible coupled deformable bracket is divided into a M-layered rigid ring body, M>2, each layer of the rigid ring body is equally divided into rigid sub-bodies with a number of N in the circumferential direction, and a corresponding layer of the rigid ring body is formed by combining the N rigid sub-bodies in the circumferential direction, the twin threaded rod is arranged between the two circumferentially adjacent rigid sub-bodies in each layer of the rigid ring body, the two threaded segments of the twin threaded rod are rotatably installed in the two corresponding rigid sub-bodies, respectively;

circumferential positions of the rigid sub-bodies in the M-layered rigid ring body are in one-to-one correspondence, M layers of the rigid sub-bodies corresponding to each circumferential position are taken as a sub-body group, so that N sub-body groups are formed by the rigid sub-bodies in each layer of the M rigid ring body, and each of the sub-body groups includes the M layers of the rigid sub-bodies;

at least one rigid telescopic component and at least two elastic components are arranged between two adjacent layers of the rigid sub-bodies in each of the sub-body groups, both ends of the rigid telescopic component are respectively ball-hinged to two corresponding layers of the rigid sub-bodies, both ends of the elastic components are respectively fixedly connected to two corresponding layers of the rigid sub-bodies, the rigid-flexible coupled elastic split-body is formed by the M layers of the rigid sub-bodies, the rigid telescopic component.

3. The rigid-flexible coupled multi-hole spray gun device with variable size for the spraying robot according to claim 1, wherein the device further includes dual-output motors, the dual-output motors are arranged on the spray gun base, each of the dual-output motors is connected to each of the rigid-flexible coupled elastic split-bodies through a flexible connector to connect to one end of the nozzle installation component, the dual-output motors pulls and act on the rigid-flexible coupled elastic split-body through the flexible connector to drive the rigid-flexible coupled elastic split-body for deforming in elastic contracting, when all the rigid-flexible coupled elastic split-bodies are driven by the dual-output motors to deform in elastic contracting, the rigid-flexible coupled deformable bracket is deformed in contracting as a whole.

4. The rigid-flexible coupled multi-hole spray gun device with variable size for the spraying robot according to claim 3, the number of dual-output motors is N, the N dual-output motors are distributed along a circumferential direction and positions of the N dual-output motors are in one-to-one correspondence with positions between the two circumferentially adjacent rigid-flexible coupled elastic split-bodies, and two output shafts of each of the dual-output motors are respectively wound with ropes, the ropes are taken as the flexible connectors;

one end of each of the ropes is respectively fixed to one end of the corresponding penetrated rigid-flexible coupled elastic split-body configured to connect with the nozzle installation component.

5. The rigid-flexible coupled multi-hole spray gun device with variable size for the spraying robot according to claim 1, the device further includes single-output motors, the single-output motors are arranged on the spray gun base, each of the single-output motors is connected to each of the twin threaded rod through transmission components, and the twin threaded rod is driven by the single-output motors through the transmission components to rotate.

6. The rigid-flexible coupled multi-hole spray gun device with variable size for the spraying robot according to claim 5, the number of the single-output motors is N, the N single-output motors are distributed along a circumferential direction and the positions of the N single-output motors are in one-to-one correspondence with the positions between the two circumferentially adjacent rigid-flexible coupled elastic split-bodies, an output shaft of each of the single-output motors is respectively wound with a transmission belt, and the transmission belt is taken as the transmission component, and the number of the transmission belts wound on each of the single-output motors is same as the number of the twin threaded rod between the two circumferentially adjacent rigid-flexible coupled elastic split-bodies; and the transmission belt of each of the single-output motors is correspondingly wound on the twin threaded rod between the two rigid-flexible coupled elastic split-bodies one by one, so that each of the single-output motors is in transmission-connection with each of the twin threaded rod between the two rigid-flexible coupled elastic split-bodies corresponding to the single-output motor through the transmission belt, and each of the twin threaded rod is driven by the corresponding single-output motor to rotate through the transmission belt.

7. The rigid-flexible coupled multi-hole spray gun device with variable size for the spraying robot according to claim 1, the paint supply assembly includes elastic paint supply pipes, and orifices of the elastic paint supply pipes are in communication with the nozzles in the nozzle assembly, and paint liquids are delivered to the nozzles by the paint supply assembly through the elastic paint supply pipes; and in the rigid-flexible coupled deformable bracket, an inner side of each of the rigid-flexible coupled elastic split-bodies is respectively connected to an circumferential outer side of the elastic paint supply pipe through a connector.

8. The rigid-flexible coupled multi-hole spray gun device with variable size for the spraying robot according to claim 7, wherein a plate surface of the nozzle installation component is divided into N painting areas in a circumferential direction, each of the painting areas is provided with a plurality of nozzles, and a position of another plate surface of the spray head plate corresponding to the painting area is provided with grooves, a plurality of paint inlets are arranged inside each of the grooves, and each nozzle in each of the painting area is communicated with the paint inlet in the corresponding groove one by one;

N elastic paint supply pipes are provided, the orifices of the N elastic paint supply pipe are in contact with the grooves on another plate surface of the nozzle plate one by one, and an area of the orifice of the elastic paint supply pipe is covered and in communication with parts of the paint inlets in the corresponding groove, an inner surface of each of the N rigid-flexible coupled elastic split-bodies is connected to a circumferential side surface of each of the N elastic paint supply pipes through the connector one by one, and side walls of the adjacent elastic paint supply pipes are connected to each other, so that the N elastic paint supply pipes are connected in parallel with each other.

9. The rigid-flexible coupled multi-hole spray gun device with variable size for the spraying robot according to claim 2, the paint supply assembly includes elastic paint supply pipes, and orifices of the elastic paint supply pipes are in communication with the nozzles in the nozzle assembly, and paint liquids are delivered to the nozzles by the paint supply assembly through the elastic paint supply pipes; and in the rigid-flexible coupled deformable bracket, an inner side of each of the rigid-flexible coupled elastic split-bodies is respectively connected to an circumferential outer side of the elastic paint supply pipe through a connector.

10. The rigid-flexible coupled multi-hole spray gun device with variable size for the spraying robot according to claim 3, the paint supply assembly includes elastic paint supply pipes, and orifices of the elastic paint supply pipes are in communication with the nozzles in the nozzle assembly, and paint liquids are delivered to the nozzles by the paint supply assembly through the elastic paint supply pipes; and in the rigid-flexible coupled deformable bracket, an inner side of each of the rigid-flexible coupled elastic split-bodies is respectively connected to an circumferential outer side of the elastic paint supply pipe through a connector.

11. The rigid-flexible coupled multi-hole spray gun device with variable size for the spraying robot according to claim 4, the paint supply assembly includes elastic paint supply pipes, and orifices of the elastic paint supply pipes are in communication with the nozzles in the nozzle assembly, and paint liquids are delivered to the nozzles by the paint supply assembly through the elastic paint supply pipes; and in the rigid-flexible coupled deformable bracket, an inner side of each of the rigid-flexible coupled elastic split-bodies is respectively connected to an circumferential outer side of the elastic paint supply pipe through a connector.

12. The rigid-flexible coupled multi-hole spray gun device with variable size for the spraying robot according to claim 5, the paint supply assembly includes elastic paint supply pipes, and orifices of the elastic paint supply pipes are in communication with the nozzles in the nozzle assembly, and paint liquids are delivered to the nozzles by the paint supply assembly through the elastic paint supply pipes; and in the rigid-flexible coupled deformable bracket, an inner side of each of the rigid-flexible coupled elastic split-bodies is respectively connected to an circumferential outer side of the elastic paint supply pipe through a connector.

13. The rigid-flexible coupled multi-hole spray gun device with variable size for the spraying robot according to claim 6, the paint supply assembly includes elastic paint supply pipes, and orifices of the elastic paint supply pipes are in communication with the nozzles in the nozzle assembly, and paint liquids are delivered to the nozzles by the paint supply assembly through the elastic paint supply pipes; and in the rigid-flexible coupled deformable bracket, an inner side of each of the rigid-flexible coupled elastic split-bodies is respectively connected to an circumferential outer side of the elastic paint supply pipe through a connector.

* * * * *